US012654354B2

(12) United States Patent
Boitouzet

(10) Patent No.: US 12,654,354 B2
(45) Date of Patent: Jun. 16, 2026

(54) METHOD FOR PRODUCING A LIGNOCELLULOSIC COMPOSITE MATERIAL AND COMPOSITE MATERIAL OBTAINED BY THIS METHOD

(71) Applicant: SAS WOODOO, Paris (FR)

(72) Inventor: Timothée Boitouzet, Paris (FR)

(73) Assignee: SAS WOODOO, Paris. (FR)

( * ) Notice: Subject to any disclaimer, the term of this patent is extended or adjusted under 35 U.S.C. 154(b) by 120 days.

(21) Appl. No.: 18/240,430

(22) Filed: Aug. 31, 2023

(65) Prior Publication Data

US 2024/0157597 A1      May 16, 2024

Related U.S. Application Data

(63) Continuation of application No. PCT/FR2022/050356, filed on Feb. 28, 2022.

(30) Foreign Application Priority Data

Mar. 1, 2021      (FR) ...................................... 2101960

(51) Int. Cl.
| | |
|---|---|
| *B27N 3/00* | (2006.01) |
| *B27N 1/00* | (2006.01) |
| *B27N 3/02* | (2006.01) |
| *B27N 3/18* | (2006.01) |
| *C08H 8/00* | (2010.01) |
| *C08J 5/04* | (2006.01) |
| *C08J 5/18* | (2006.01) |

(52) U.S. Cl.
CPC ................. *B27N 3/02* (2013.01); *B27N 1/00* (2013.01); *B27N 3/002* (2013.01); *B27N 3/18* (2013.01); *C08H 8/00* (2013.01); *C08J 5/04* (2013.01); *C08J 5/18* (2013.01); *C08J 2397/02* (2013.01); *C08J 2425/08* (2013.01)

(58) Field of Classification Search
CPC ................................... B27N 3/02; B27N 1/00
See application file for complete search history.

(56) References Cited

U.S. PATENT DOCUMENTS

| | | | |
|---|---|---|---|
| 3,607,355 A | 9/1971 | Loeb et al. | |
| 3,750,303 A | 8/1973 | Gates et al. | |
| 3,968,276 A | 7/1976 | Allen | |
| 4,025,663 A | 5/1977 | Brandt | |
| 4,178,861 A | 12/1979 | Vandernoek et al. | |
| 4,239,906 A | 12/1980 | Antrim et al. | |
| 4,348,256 A | 9/1982 | Bergstrom et al. | |
| 4,956,048 A | 9/1990 | Hise | |
| 4,992,308 A | 2/1991 | Sunol | |
| 5,041,192 A | 8/1991 | Sunol et al. | |
| 5,169,687 A | 12/1992 | Sunol | |
| 5,529,663 A | 6/1996 | Springer | |
| 5,804,035 A * | 9/1998 | Michanickl ............ | B27N 3/007 162/10 |

| | | |
|---|---|---|
| 6,242,245 B1 | 6/2001 | Amann et al. |
| 6,649,245 B2 | 11/2003 | Lenderink |
| 6,670,077 B1 | 12/2003 | Huang |
| 6,770,168 B1 | 8/2004 | Stigsson |
| 6,830,784 B2 | 12/2004 | Gutowski et al. |
| 7,846,295 B1 | 12/2010 | Medoff |
| 7,959,765 B2 | 6/2011 | Argyropoulos |
| 8,546,109 B2 | 10/2013 | Varanasi et al. |
| 8,575,374 B1 | 11/2013 | DeLong et al. |
| 8,772,406 B2 | 7/2014 | Linhardt et al. |
| 8,986,501 B2 | 3/2015 | Li et al. |
| 9,343,733 B2 | 5/2016 | Lee et al. |
| 10,030,157 B2 | 7/2018 | Humiston et al. |
| 10,538,012 B2 | 1/2020 | Boitouzet et al. |
| 11,254,026 B2 | 2/2022 | Boitouzet et al. |
| 11,656,756 B2 | 5/2023 | Thevenin et al. |
| 11,662,899 B2 | 5/2023 | Thevenin et al. |
| 11,820,041 B2 | 11/2023 | Boitouzet |
| 2002/0096274 A1 | 7/2002 | Lindstrom et al. |
| 2002/0142145 A1 | 10/2002 | Lenderink |
| 2002/0154100 A1 | 10/2002 | Hatakeda et al. |
| 2003/0071389 A1 * | 4/2003 | Manning .................. B27N 9/00 264/109 |
| 2004/0090426 A1 | 5/2004 | Bourdelais et al. |
| 2004/0187998 A1 * | 9/2004 | Okuzawa ................. B27N 1/00 156/62.4 |
| 2005/0110722 A1 | 5/2005 | Hayafuji |
| 2005/0163935 A1 | 7/2005 | Magne et al. |
| 2005/0233069 A1 | 10/2005 | Mikami et al. |

(Continued)

FOREIGN PATENT DOCUMENTS

| | | |
|---|---|---|
| CA | 1095663 A | 2/1981 |
| CA | 1186855 A | 5/1985 |

(Continued)

OTHER PUBLICATIONS

How To Weight A Tree. Shodor Education Foundation, 2002; [retrieved on Jul. 9, 2019]. Available at URL: Available at https://shodor.org/succeedhi/succeedhi/weightree/percentWater-content.html pp. 1-3.

Kuhns, Michael et al. Wood Heating. Utah State University, Forestry Extension ; [retrieved on Dec. 13, 2024]. Available at URL:https://extension.usu.edu/forestry/resources/forest-products/wood-heating pp. 1-6.

U.S. Appl. No. 17/207,189 Office Action dated Jun. 10, 2024.
U.S. Appl. No. 17/576,799 Office Action dated Sep. 16, 2024.
U.S. Appl. No. 18/168,920 Office Action dated Dec. 19, 2024.
Berglund L. et al.; "Lignin-Retaining Transparent Wood", ChemSusChem, 2017, No. 10, pp. 3445-3451.

(Continued)

*Primary Examiner* — Andrew D Graham
(74) *Attorney, Agent, or Firm* — IWilson Sonsini Goodrich & Rosati

(57) ABSTRACT

The present invention relates to a method for producing a lignocellulosic composite material, a lignocellulosic composite material that can be obtained with this method, and the use of said lignocellulosic composite material.

20 Claims, No Drawings

(56)  References Cited

U.S. PATENT DOCUMENTS

| | | | |
|---|---|---|---|
| 2006/0093745 A1* | 5/2006 | Nicholson | C08G 18/6204 |
| | | | 427/393 |
| 2006/0262258 A1 | 11/2006 | Wang et al. | |
| 2008/0020222 A1 | 1/2008 | Hiraku et al. | |
| 2008/0160288 A1 | 7/2008 | Kingma et al. | |
| 2008/0223629 A1 | 9/2008 | Kashikawa et al. | |
| 2009/0176052 A1 | 7/2009 | Childs et al. | |
| 2009/0294186 A1 | 12/2009 | Fontanella et al. | |
| 2010/0081798 A1 | 4/2010 | Balensiefer et al. | |
| 2010/0119857 A1* | 5/2010 | Johnson | B27N 3/04 |
| | | | 428/537.1 |
| 2010/0156842 A1 | 6/2010 | Cherif | |
| 2011/0039470 A1 | 2/2011 | Wakeman et al. | |
| 2011/0115723 A1 | 5/2011 | Wang et al. | |
| 2011/0190402 A1 | 8/2011 | Linhardt et al. | |
| 2011/0220307 A1 | 9/2011 | Duggirala et al. | |
| 2011/0254778 A1 | 10/2011 | Wang et al. | |
| 2012/0105370 A1 | 5/2012 | Moore | |
| 2012/0135189 A1 | 5/2012 | Olivieri | |
| 2012/0146922 A1 | 6/2012 | Kang et al. | |
| 2012/0268693 A1 | 10/2012 | Takeda et al. | |
| 2012/0313867 A1 | 12/2012 | Luo et al. | |
| 2013/0063684 A1 | 3/2013 | Chen et al. | |
| 2013/0113726 A1 | 5/2013 | Tovar et al. | |
| 2013/0167603 A1 | 7/2013 | Bathurst et al. | |
| 2013/0326939 A1 | 12/2013 | Lawrence et al. | |
| 2014/0058077 A1 | 2/2014 | Laukkanen et al. | |
| 2014/0090577 A1* | 4/2014 | Sniady | C08H 6/00 |
| | | | 106/162.5 |
| 2014/0139560 A1 | 5/2014 | Jung et al. | |
| 2014/0186592 A1 | 7/2014 | Jeon et al. | |
| 2014/0269411 A1 | 9/2014 | Pelland et al. | |
| 2014/0275361 A1* | 9/2014 | Williamson | C09J 167/06 |
| | | | 524/72 |
| 2014/0311201 A1 | 10/2014 | Bathurst | |
| 2014/0311984 A1 | 10/2014 | Nakama et al. | |
| 2015/0035794 A1 | 2/2015 | Zhitomirskiy | |
| 2015/0090157 A1* | 4/2015 | Sniady | C09J 197/005 |
| | | | 264/128 |
| 2015/0210904 A1* | 7/2015 | Cothran | B32B 21/14 |
| | | | 156/283 |
| 2015/0274357 A1* | 10/2015 | Linares | B05D 1/02 |
| | | | 428/221 |
| 2015/0301603 A1 | 10/2015 | Maggiali et al. | |
| 2016/0010279 A1 | 1/2016 | Hu et al. | |
| 2016/0041646 A1 | 2/2016 | Cho et al. | |
| 2016/0187544 A1 | 6/2016 | Watanabe et al. | |
| 2016/0209551 A1 | 7/2016 | Bekku et al. | |
| 2016/0257814 A1* | 9/2016 | Schade | D21B 1/00 |
| 2016/0297970 A1 | 10/2016 | Garoff et al. | |
| 2017/0107641 A1 | 4/2017 | Busardo et al. | |
| 2017/0146730 A1 | 5/2017 | O'Keeffe | |
| 2017/0232782 A1 | 8/2017 | Thies et al. | |
| 2018/0059845 A1 | 3/2018 | Tada et al. | |
| 2018/0157111 A1 | 6/2018 | Ueki et al. | |
| 2018/0162891 A1 | 6/2018 | Miettinen | |
| 2018/0188870 A1 | 7/2018 | Boggs et al. | |
| 2018/0201765 A1 | 7/2018 | Sun et al. | |
| 2018/0208804 A1 | 7/2018 | Mieda et al. | |
| 2018/0217690 A1 | 8/2018 | Bauer | |
| 2018/0260602 A1 | 9/2018 | He et al. | |
| 2018/0284947 A1 | 10/2018 | Khajeh et al. | |
| 2018/0318773 A1 | 11/2018 | Childs et al. | |
| 2018/0327612 A1 | 11/2018 | Humiston et al. | |
| 2018/0329584 A1 | 11/2018 | Williams et al. | |
| 2018/0329586 A1 | 11/2018 | Sundstrom et al. | |
| 2018/0342702 A1 | 11/2018 | Hu et al. | |
| 2018/0345530 A1* | 12/2018 | Schrul | C04B 26/10 |
| 2018/0370071 A1* | 12/2018 | Boitouzet | C08B 1/003 |
| 2019/0012032 A1 | 1/2019 | Brandao Salgado et al. | |
| 2019/0018512 A1 | 1/2019 | Kim et al. | |
| 2019/0077040 A1 | 3/2019 | Boitouzet et al. | |
| 2019/0113791 A1 | 4/2019 | Yamamoto et al. | |
| 2019/0121474 A1 | 4/2019 | Lee et al. | |
| 2019/0121481 A1 | 4/2019 | Schoenauer et al. | |
| 2019/0129543 A1 | 5/2019 | Watanabe | |
| 2019/0131572 A1 | 5/2019 | Gwon et al. | |
| 2020/0164542 A1 | 5/2020 | Boitouzet | |
| 2020/0223091 A1 | 7/2020 | Hu et al. | |
| 2020/0238565 A1 | 7/2020 | Hu et al. | |
| 2020/0363721 A1 | 11/2020 | Aritoshi et al. | |
| 2021/0019033 A1 | 1/2021 | Thevenin et al. | |
| 2021/0122902 A1 | 4/2021 | Hu et al. | |
| 2021/0240588 A1 | 8/2021 | Balthazar De Lima Mussauer et al. | |
| 2021/0316471 A1 | 10/2021 | Thevenin et al. | |
| 2022/0134596 A1 | 5/2022 | Boitouzet et al. | |
| 2022/0283685 A1 | 9/2022 | Thevenin et al. | |
| 2023/0140418 A1 | 5/2023 | Patour et al. | |
| 2023/0418460 A1 | 12/2023 | Thevenin et al. | |

FOREIGN PATENT DOCUMENTS

| | | | |
|---|---|---|---|
| CN | 1429695 A | 7/2003 | |
| CN | 1813900 A | 8/2006 | |
| CN | 1872508 A | 12/2006 | |
| CN | 1911612 A | 2/2007 | |
| CN | 1985891 A | 6/2007 | |
| CN | 101279458 A | 10/2008 | |
| CN | 101476252 A | 7/2009 | |
| CN | 101649125 A | 2/2010 | |
| CN | 102152356 A | 8/2011 | |
| CN | 102660885 A | 9/2012 | |
| CN | 102704297 A | 10/2012 | |
| CN | 102785274 A | 11/2012 | |
| CN | 102864672 A | 1/2013 | |
| CN | 202882247 U | 4/2013 | |
| CN | 103370469 A | 10/2013 | |
| CN | 103993042 A | 8/2014 | |
| CN | 104275723 A | 1/2015 | |
| CN | 104389216 A | 3/2015 | |
| CN | 104448585 A | 3/2015 | |
| CN | 104651964 A | 5/2015 | |
| CN | 106243391 A | 12/2016 | |
| DE | 19714302 A1 | 10/1998 | |
| EP | 0328533 A1 | 8/1989 | |
| EP | 1312453 A2 | 5/2003 | |
| EP | 2295215 A1 | 3/2011 | |
| EP | 2366949 A1 | 9/2011 | |
| EP | 2669382 A1 | 12/2013 | |
| EP | 3047656 A1 | 7/2016 | |
| EP | 2850109 B1 | 8/2017 | |
| EP | 2935604 B1 | 11/2018 | |
| EP | 3656520 A1 | 5/2020 | |
| FR | 858764 A | 12/1940 | |
| FR | 2507639 A1 | 12/1982 | |
| FR | 2672296 A1 | 8/1992 | |
| JP | S60229704 A | 11/1985 | |
| JP | S60242003 A | 12/1985 | |
| JP | S6162574 A | 3/1986 | |
| JP | S61102211 A | 5/1986 | |
| JP | S6297803 A | 5/1987 | |
| JP | H02160986 A | 6/1990 | |
| JP | H04336202 A | 11/1992 | |
| JP | H04357023 A | 12/1992 | |
| JP | H05138615 A | 6/1993 | |
| JP | 2000514015 A | 10/2000 | |
| JP | 2009073406 A | 4/2009 | |
| JP | 2009531229 A | 9/2009 | |
| JP | 2010042604 A | 2/2010 | |
| JP | 2010163497 A | 7/2010 | |
| JP | 2011225847 A | 11/2011 | |
| JP | 2012009233 A | 1/2012 | |
| JP | 2012510082 A | 4/2012 | |
| JP | 2012093667 A | 5/2012 | |
| JP | 2015020307 A | 2/2015 | |
| JP | 2015077740 A | 4/2015 | |
| JP | 2017504235 A | 2/2017 | |
| JP | 2017207906 A | 11/2017 | |
| JP | 6244808 B2 | 12/2017 | |
| KR | 100977721 B1 | 8/2010 | |
| RU | 2309039 C2 | 10/2007 | |
| RU | 2007144304 A | 6/2009 | |

(56)  References Cited

FOREIGN PATENT DOCUMENTS

| SU | 1657225 A1 | 6/1991 |
| WO | WO-8901856 A1 | 3/1989 |
| WO | WO-9002612 A1 | 3/1990 |
| WO | WO-9002836 A1 | 3/1990 |
| WO | WO-03099533 A1 | 12/2003 |
| WO | WO-2010089604 A1 | 8/2010 |
| WO | WO-2011112703 A2 | 9/2011 |
| WO | WO-2012080702 A2 | 6/2012 |
| WO | WO-2013005104 A2 | 1/2013 |
| WO | WO-2013066196 A1 | 5/2013 |
| WO | WO-2013144420 A1 | 10/2013 |
| WO | WO-2013181481 A1 | 12/2013 |
| WO | WO-2014002674 A1 | 1/2014 |
| WO | WO-2014113884 A1 | 7/2014 |
| WO | WO-2015084520 A1 | 6/2015 |
| WO | WO-2016138901 A1 | 9/2016 |
| WO | WO-2017029120 A1 | 2/2017 |
| WO | WO-2017098149 A1 | 6/2017 |
| WO | WO-2017136714 A1 | 8/2017 |
| WO | WO-2018013501 A1 | 1/2018 |
| WO | WO-2018068583 A1 | 4/2018 |
| WO | WO-2017098149 A9 | 5/2018 |
| WO | WO-2018120560 A1 | 7/2018 |
| WO | WO-2018130776 A1 | 7/2018 |
| WO | WO-2018182497 A1 | 10/2018 |
| WO | WO-2018191181 A1 | 10/2018 |
| WO | WO-2018211945 A1 | 11/2018 |
| WO | WO-2018224598 A1 | 12/2018 |
| WO | WO-2019055680 A1 | 3/2019 |
| WO | WO-2019155159 A1 | 8/2019 |
| WO | WO-2020058629 A1 | 3/2020 |
| WO | WO-2022008831 A1 | 1/2022 |
| WO | WO-2022185001 A1 | 9/2022 |

OTHER PUBLICATIONS

Berglund L. et al.; "Optically Transparent Wood from a Nanoporous Cellulosic Template: Combining Functional and Structural Performance", Biomacromolecules, 2016, No. 17, pp. 1358-1364.

Berglund L. et al.; "Transparent Wood for Functional and Structural Applications", Royal Society Publishing, Downloaded on Dec. 27, 2017, pp. 1-15.

Birkel, J. The surface impregnation of wood: II. use characteristics of impregnated wood: III. investigations of resin adhesives. (1946). Electronic Theses and Dissertations. Paper 1872.

Chen, H. Lignocellulosic Material. From: Handbook of Thermoset Plastics (Third Edition), 2014.

Co-pending U.S. Appl. No. 18/168,920, inventors Thevenin; Raphaële et al., filed on Feb. 14, 2023.

Engineering ToolBox, (2008). Refractive Index common Liquids, Solids and Gases. [online] Available at: https://www.engineeringtoolbox.com/refractive-index-d_1264.html.

Fink, S. Transparent Wood—A New Approach in the Functional Study of Wood Structure. Holzforschung. vol. 46 (1992) No. 5 pp. 403-408. DOI:10.1515/hfsg.1992.46.5.403.

Ganeshram, et al. Synthesis and characterization of phenol form-aldehyde resin as a binder used for coated abrasives. Indian Journal of Science and Technologie, vol. 6 (6S), Jun. 2013, p. 4816.

Grinins, et al. Investigation of Birch Wood Impregnation with Phenol-Formaldehyde (PF) Resins. Sep. 2018; Conference: 9th European Conference on Wood Modification, At Arnhem, The Netherlands.

Hexion. Hot topic: Evolving fire performance requirements can be met through the use of phenolic resins. Composite Materials. Railway Interiors International. Annual Showcase 2019. pp. 74-75. Retrieved online at https://www.hexion.com/docs/default-source/psr/evolving-fire- performance-requirements-can-be-met-through-the-use-of-phenolic-resins.pdf?sfvrsn=aae6b95e_4.

Hu, L. et al; Highly Anisotripic, Highly Transparent Wood Composites. Adv Mater. Jul. 2016;28(26):5181-7. doi: 10.1002/adma.201600427. Epub May 4, 2016.

Hu, L. et al; "Novel Nanostructured Paper with Ultrahigh Transparency and Ultrahigh Haze for Solar Cells", Nano Letters, 2014, 14, pp. 765-773.

Hu, L. et al; "Wood Composite as an Energy Efficient Building Material: Guided. Sunlight Transmittance and Effective Thermal Insulation", 2016, Adv. Energy Mater., 6, 1601122, pp. 1-7.

Li, et al. Lignin-Retaining Transparent Wood. ChemSusChem. Sep. 11, 2017; 10(17): 3445-3451.

Liew, et al. Direct Cellulase Gene Amplification From Hot Spring Using the Guidance of 16S rRNA Amplicon Metagenomics. In Metagenomics, 2018.

Luce, Foster. Delignified Impregnated Wood. Research Engineer, Westcraft, Inc., Los Angeles, California. Oct. 1944: 654-657.

Mathews, et al. Bacterial biodegradation and bioconversion of industrial lignocellulosic streams. Appl Microbiol Biotechnol. Apr. 2015;99(7):2939-2954. doi: 10.1007/s00253-015-6471-y. Epub Feb. 27, 2015.

Mi, et al. Scalable aesthetic transparent wood for energy efficient buildings. Nature communications 11.1 (2020): 1-9.

Nogi, M. et al; "Optically Transparent Nanofiber Paper", Advanced Material, 2009, 21, pp. 1595-1598.

Norman et al; "A new method for the determination of cellulose, based upon observations on the removal of lignin and other encrusting materials", Biochem J. 1933; 27(3): 818-831.

NPTEL. Preparation of wood pulp by sulfate (kraft) process. Accessed online Feb. 15, 2013 at https://nptel.ac.in/courses/103103029/pdf/rnod4.pdf.

PCT/EP2018/065047 International Search Report with Written Opinion dated Aug. 21, 2018.

PCT/FR2016/053247 International Search Report with Written Opinion dated Mar. 7, 2017.

PCT/FR2019/050262 International Search Report with Written Opinion dated May 23, 2019.

PCT/FR2019/052177 International Search Report with Written Opinion dated Jan. 16, 2020.

PCT/FR2021/051236 International Search Report with Written Opinion dated Sep. 24, 2021.

PCT/FR2022/050356 International Search Report with Written Opinion dated Jun. 9, 2022.

Ritter, George J.; "Distribution of Lignin in Wood Microscopical Study of Changes in Wood Structure Upon Subjection to Standard Methods of Isolating Cellulose and Lignin", Industrial and Engineering Chemistry, Nov. 1925, vol. 17, No. 11, pp. 1194-1197.

Roger M. Rowell, et al, Handbook of Wood Chemistry and Wood Composites, 2012.

Song, et al. Processing bulk natural wood into a high-performance structural material. Nature. Feb. 8, 2018; vol. 554, pp. 224+.

Swedish Standards Institute. SS-EN 13183-1. Moisture content of a piece of sawn timber—Part 1: Determination by oven dry method. Apr. 11, 2003 (This document contains the official English version of the European Standard EN 13183-1:2002).

Tanaka, et al. Solute diffusion into cell walls in solution-impregnated wood under conditioning process I: effect of relative humidity on solute diffusivity. J Wood Sci. (61):543-551 (2015). https://doi.org/10.1007/s10086-015-1503-x.

The Dow Chemical Company. Ethanolamines: Monoethanolamine Diethanolamine Triethanolamine. Published Jan. 2003. 21 pages. Retrieved online at http://www.resikem.com.ar/images/dow-ethanolamines.pdf.

ToolBox—Refractive Index for some common Liquids, Solids and GasesSome common fluids and their refractive index Available at https://www.engineeringtoolbox.com/refractive-index-d_1264.html. Accessed on Apr. 2021.

Torres, D. Why knock on wood when touch will do? MSP Low-Power Plays—Blogs—TI E2E Community. May 25, 2017. Availabe at https://e2e.ti.com/blogs_/b/process/archive/2017/05/25/why-knock-on-wood-when-touch-will-do. Retrieved Oct. 1, 2020.

U.S. Appl. No. 15/781,978 Notice of Allowance dated Oct. 14, 2021.

U.S. Appl. No. 15/781,978 Office Action dated Jul. 6, 2020.

U.S. Appl. No. 15/781,978 Office Action dated May 14, 2021.

U.S. Appl. No. 15/781,978 Office Action dated Nov. 16, 2020.

U.S. Appl. No. 16/185,342 Notice of Allowance dated Sep. 4, 2019.

(56)　　　　References Cited

OTHER PUBLICATIONS

U.S. Appl. No. 16/185,342 Office Action dated Mar. 22, 2019.
U.S. Appl. No. 16/700,123 Notice of Allowance dated Jul. 20, 2023.
U.S. Appl. No. 16/700,123 Office Action dated Apr. 23, 2021.
U.S. Appl. No. 16/700,123 Office Action dated Aug. 23, 2022.
U.S. Appl. No. 16/700,123 Office Action dated Mar. 28, 2023.
U.S. Appl. No. 16/700,123 Office Action dated Oct. 5, 2021.
U.S. Appl. No. 16/944,706 Notice of Allowance dated Aug. 5, 2022.
U.S. Appl. No. 16/944,706 Notice of Allowance dated Jan. 31, 2023.
U.S. Appl. No. 16/944,706 Notice of Allowance dated Jun. 16, 2022.
U.S. Appl. No. 16/944,706 Notice of Allowance dated May 18, 2022.
U.S. Appl. No. 16/944,706 Notice of Allowance dated Sep. 7, 2022.
U.S. Appl. No. 16/944,706 Office Action dated Apr. 1, 2021.
U.S. Appl. No. 16/944,706 Office Action dated Dec. 30, 2021.
U.S. Appl. No. 17/576,799 Office Action dated Apr. 28, 2023.
U.S. Appl. No. 17/576,799 Office Action dated Jun. 8, 2022.
U.S. Appl. No. 17/576,799 Office Action dated Oct. 10, 2023.
U.S. Appl. No. 17/576,799 Office Action dated Sep. 21, 2022.

U.S. Appl. No. 17/824,222 Notice of Allowance dated Apr. 19, 2023.
U.S. Appl. No. 17/824,222 Notice of Allowance dated Dec. 29, 2022.
U.S. Appl. No. 17/824,222 Notice of Allowance dated Jan. 12, 2023.
U.S. Appl. No. 17/824,222 Notice of Allowance dated Jan. 27, 2023.
U.S. Appl. No. 17/824,222 Office Action dated Aug. 18, 2022.
U.S. Appl. No. 15/781,978 Office Action dated Feb. 13, 2020.
U.S. Appl. No. 15/781,978 Office Action dated Sep. 24, 2019.
Zhu, et al. Anisotropic, Transparent Films with Aligned Cellulose Nanofibers. Adv Mater. Jun. 2017;29(21).
Zhu, et al. Highly Anisotropic, Highly Transparent Wood Composites. Adv Mater. Jul. 2016;28(26):5181-7.
Zhu, L. et al; "Transparent and Hazewood Composites for Highly Efficient Broadband Light Management in Solar Cells", 2016. Nano Energy, 26, pp. 332-339.
U.S. Appl. No. 17/207,189 Office Action dated Dec. 21, 2023.
U.S. Appl. No. 18/168,920 Office Action dated Apr. 4, 2024.
U.S. Appl. No. 17/207,189 Office Action dated May 5, 2025.
U.S. Appl. No. 17/576,799 Office Action dated Apr. 2, 2025.

* cited by examiner

METHOD FOR PRODUCING A LIGNOCELLULOSIC COMPOSITE MATERIAL AND COMPOSITE MATERIAL OBTAINED BY THIS METHOD

CROSS-REFERENCE TO RELATED APPLICATIONS

This application is a continuation of International Patent Application No. PCT/FR2022/050356, filed Feb. 28, 2022, which claims priority to French Patent Application No. 2101960, filed Mar. 1, 2021, which applications are incorporated herein by reference in their entirety for all purposes.

FIELD OF THE INVENTION

The present invention relates to a method for producing a lignocellulosic composite material, a lignocellulosic composite material able to be obtained by this method and the use of this lignocellulosic composite material.

TECHNOLOGICAL BACKGROUND

The production of plastics is at the present time approximately 320 million tonnes per annum and approximately 40% of the plastic produced is used in the packaging sector. The production of plastics for packaging is projected at 1.2 billion tonnes per annum by 2050. In the automobile sector, the percentage of plastics materials that are to be recycled is equivalent to 7.6 million tonnes and is increasing by 3 to 5% per annum.

Since consumers are more and more attentive to sustainable development, industry must change paradigm to respond to their expectations. The requirement is thus turning towards lightweight efficient materials with a low carbon footprint such as biosourced composite materials.

Many constructors and equipment manufacturers have massively turned towards new composites based on natural fibers, as shown by the increase of 21% in the use of wood composites in 2019, and in particular towards composites based on hemp, thus making it possible to extend the carbon life cycle while offering a strong alternative to plastics material and to aluminium. Thus biosourced composite materials and the method for manufacturing same constitute a major hope for industry and more broadly the mobility industry, in order by 2030 to reduce by 37.5% the threshold of $CO_2$ emissions fixed by the European Commission.

Current composite materials are manufactured from pre-impregnated polymer/cellulose or polymer/wood in masterbatch form.

The existing manufacturing methods of the prior art such as masterbatch have many constraints listed below:

difficulty in preparing the masterbatch: preparing a lignocellulosic/polymer masterbatch (WPC type) is lengthy and complex since it requires grinding wood into discrete fibers followed by mixing the fibers obtained with a polymer, the fibers dispersion, which has to be implemented in a controlled homogeneous manner to confer consistent and replicable characteristics on the final material. The need is also added to have a pre-mixed material ready to be used and the difficulty in adhesion between the hydrophilic cellulosic fibers and the hydrophobic polymer. This is because it is difficult to control the moisture level (hygroscopy) of the non-treated fibers or chips (unlike treated discrete fibers as in the paper industry made hydrophobic) and the lignocellulosic reinforcement used has a tendency to take up water, thus creating polymer-wood adhesion defects during the preparation of the masterbatch and subsequently problems in delamination of the object;

difficulty in use when the proportion of fibers is greater than 40%: the masterbatch method requires providing a mixture having low viscosity to facilitate the transformation method (injection, extrusion, moulding, etc); however, the higher the density of fibers, the more the mixture is viscous and clogs the equipment;

difficulty in use and differential shrinkage when the proportion of fiber is below 20%: the lower the proportion of fibre, the more the shrinkage coefficient of the material increases (and departs from the expected geometry, "net shape"), thus creating problems of stripping of the part in the equipment and soiling of the tool. In parallel, the more the proportion of fiber decreases, the more the environmental performance of the product decreases;

difficulty in homogeneity and technical repeatability: dispersion of the fibers must take place uniformly in the polymer matrix to ensure homogeneous and repeatable/replicable characteristics. However, the less polymer there is, the more difficult it is to disperse the fibers uniformly in the matrix. This method also gives rise to a large amount of production rejects and industrial waste;

aesthetic difficulties: the finer the wood sawdust, the less the material has the required aesthetic qualities (natural appearance). On the other hand, the larger the chips (with a size greater than 10 mm) the more difficult it is to use the masterbatch (it is impossible to inject or extrude with large chips since the tool clogs up);

other aesthetic difficulties such as the problems related to the uniformity of colour (chips/sawdust with a greater or lesser lignin content, giving different colours to the lignocellulosic materials) and related to the odour due to the presence of extractables of the terpene type;

technical difficulty in assembling: in order to end up with the aesthetic characteristics sought, the methods of the prior art report an accumulation of layers bonded by heat or ultrasound (a fine sawdust structure layer and then a finishing layer in coarser chips) thus multiplying the technical operations, making the assembly more complex due to a differential surface tension and increasing the cycle time and the resulting cost;

difficulty relating to recycling and environmental performance: current solutions in multilayers by moulding a mixture in sheet form (SMC) or co-extrusion/injection using different formulations (various types of polymer, of additive layers and wood-polymer coupling agents) which leads to a multimaterial assembly and makes more complex, or even impossible recycling. This difficulty emphasises the importance of favouring single-material solutions for the various functionalities of the product (cap, screw thread, system of openings, finishing surface, etc).

The cellulosic composite materials obtained according to the methods of the prior art are polymer matrices with an interior fibrous reinforcement (anarchic lattice of fibers encapsulated in polymer granules).

SUMMARY OF THE INVENTION

A first object of the invention relates to a method for manufacturing a lignocellulosic composite material comprising the following steps:

(1) a step of impregnating a lignocellulosic material with at least one filling element so as to obtain an impregnated lignocellulosic material;

(2) a step of grinding the impregnated lignocellulosic material obtained at the end of step (1) so as to obtain chips of impregnated lignocellulosic material ready to be used;

(3) a step of using the chips of impregnated lignocellulosic material obtained at the end of step (2) so as to obtain a lignocellulosic composite material.

Another object of the invention is a lignocellulosic composite material able to be obtained by the method according to the invention, characterised in that it is reinforced from outside.

The invention also relates to the use of the lignocellulosic composite material as defined previously for manufacturing containers, parts or surfaces.

DETAILED DESCRIPTION

Surprisingly and unexpectedly, the inventors found that the method according to the invention made it possible to overcome the drawbacks of the methods of the prior art while making it possible to obtain a composite material reinforced from outside, biosourced, able to be recycled, making it possible to develop novel technical parts (in particular for the packaging, transport and building industry) that are lightweight, inexpensive, with a low carbon footprint and having excellent mechanical and physicochemical properties.

A first object of the invention relates to a method for manufacturing a lignocellulosic composite material comprising the following steps:

(1) a step of impregnating a lignocellulosic material with at least one filling element so as to obtain an impregnated lignocellulosic material;

(2) a step of grinding the impregnated lignocellulosic material obtained at the end of step (1) so as to obtain chips of impregnated lignocellulosic material;

(3) a step of using the chips of impregnated lignocellulosic material obtained at the end of step (2) so as to obtain a lignocellulosic composite material.

More particularly, the invention relates to a method for manufacturing a lignocellulosic composite material comprising the following steps:

(1) a step of impregnating a lignocellulosic material with at least one filling element so as to obtain an impregnated lignocellulosic material;

(2) a step of grinding the impregnated lignocellulosic material obtained at the end of step (1) so as to obtain chips of impregnated lignocellulosic material ready to be used;

(3) a step of using the chips of impregnated lignocellulosic material obtained at the end of step (2) so as to obtain a lignocellulosic composite material.

"Derived from X" means, according to the invention, a compound synthesised from the compound X by a short sequence of chemical reactions essentially keeping the identity (i.e. the principal chemical structure) of the compound X, such as an addition of a function or an increase in the length of the carbon chain (i.e. an addition of carbon chain) or an oxidation or a reduction or a nucleophilic substitution or a ring opening.

"Obtained at the end of step (X)" means preferably obtained directly at the end of step (X) or obtained following an intermediate step that follows step (X).

The lignocellulosic material used at step (1) can be any material formed by a three-dimensional lattice of cellulose, and lignin, such as for example wood, straw, natural textiles (such as flax or hemp), the entire forest biomass, including bamboo, high-yield dough, paper, cardboard, and cotton. This material may also comprise at least one polysaccharide. Such a list includes fibrous compounds (i.e. containing fibers in the native state), such as hemp or flax, but also fibrous compounds (i.e. transformed products containing an addition of fibers) and annual grasses.

Preferably, the lignocellulosic material used at step (1) is wood. The wood may be green wood, wet wood or dry wood as defined in WO2017098149 (A1) or in WO2018224598 (A1). For example, this may be wood used after possible storage of a greater or lesser duration (a few days to a few years). This wood may have been transformed after felling, i.e. after having being cut, sawn, planed, relieved of its bark, its sapwood or its heart wood, or be an engineering wood. This may also be an aged wood, i.e. a wood that has already been used such as for example construction wood. This wood may come from various species or types such as those defined in WO2017098149 (A1) or in WO2018224598 (A1). This wood may have undergone physical or chemical treatment.

The lignocellulosic material may, for example, be in the form of a sheet, a plank, a plate or a solid wood veneer.

Preferably, the composite material obtained comprises between 10 and 90% by weight, preferably between 25 and 75% by weight, and more preferentially between 30 and 50% by weight fibers with respect to the total weight of the composite material obtained.

"At least one" means one or more, preferably one, two, three, four, five, six, seven, eight, nine or ten, more preferentially one, two, three, four or five, or even more preferentially one, two or three.

"Chips" means an offcut of material produced by shredding, grinding, machining or other mechanical operation. In the present invention, the chips are an offcut of lignocellulosic material, preferably wood, resulting from the grinding step. Preferably, the size of the chips used is greater than or equal to 0.5 mm, preferably varies between 0.5 mm and 20 mm, more preferentially between 2 mm and 15 mm and even more preferentially between 5 mm and 10 mm.

"Impregnated chips" means an offcut of material produced by shredding, grinding, machining or other mechanical operation, preferably by grinding, of a lignocellulosic material, preferably wood, impregnated with a filling compound.

The step of impregnating a lignocellulosic material with at least one filling element is a step during which the filling compound penetrates the lignocellulosic material. The filling compound must usually have the property of binding to the fibers of the lignocellulosic material still present within the structure, by chemical or physicochemical anchoring.

The impregnation step (1) may comprise putting a lignocellulosic material in contact with a filling element, for example by putting the lignocellulosic material in contact with a fluid containing the filling element. The step of putting the lignocellulosic material in contact with a fluid containing the filling element may be implemented by soaking. "Soaking" means that the material is put in contact with a fluid by means of the major part, preferably almost all, of its external surface. Thus soaking does not necessarily mean immersion; this may quite simply be a partial or total putting in contact with a fluid. The impregnation may result from the action of at least one of the following forces: diffusion forces, capillary forces, gravity forces, agitation forces external to the compound undergoing the soaking, or any other forces acting on the capacity of the fluid to move. Several of these forces acting together, to produce identical or even opposite effects, is not excluded.

Various techniques are possible for this impregnation step, as is known to a person skilled in the art. In general, these techniques are of the series type (replacement of one fluid with another fluid by steps in the course of a series, repeated several times, successive impregnations, the concentrations of the filling compound in each fluid increasing incrementally, such as exponentially). Examples of techniques comprise, but are not limited to, techniques by injection of the filling compound under vacuum or under pressure by a technique of the RTM type (standing for "Resin Transfer Moulding") or Light RTM, by infusion of the filling compound by a technique of the RIFT type (standing for "Resin Infusion under Flexible Tooling"), by vacuum or pressure method or by a method using a supercritical or subcritical phase in a reactor, autoclave or furnace under vacuum or by soaking in a vessel or any other apparatus that a person skilled in the art knows is suitable for implementing this step.

Perfecting the conditions for the impregnation step is within the capability of a person skilled in the art.

In the case of the use of an autoclave, it can be recommended alternating phases under vacuum with phases under pressure in order to properly impregnate the lignocellulosic material. This is because this alternation advantageously forces the filling compound to penetrate the material because of the difference in pressure thus created.

The impregnation step can be implemented under pressure. This pressure is generally from 0.1 to 2.5 MPa.

The impregnation step (1) can advantageously be implemented under an oxygen-free atmosphere, either under vacuum or in the presence of a neutral gas such as dinitrogen or argon under pressure or a supercritical or subcritical compound (i.e. in the supercritical or subcritical state). The use of a neutral gas advantageously makes it possible to avoid the evaporation of the filling compound during the method, and thus to avoid contact of said compound with the ambient air, and in particular the oxygen in the air.

The impregnation step can thus be implemented during a period of a few minutes to 24 hours, for example and preferably from 20 to 24 hr, by 500 mL of volume of filling compound, the volume being adapted for ensuring filling of the structure taking into account the retraction of the oxygen present in the cavities of the lignocellulosic material and the possible evaporation of the filling compound in the case of putting under vacuum and/or of heating.

As mentioned previously, the impregnation step (1) can be implemented in one or more substeps, for example in at least a series of at least two successive substeps, each substep being implemented by the same fluid or by a different fluid per substep, or by gradual increase of the concentrations, in the same fluid, of filling compound during the substeps.

An example of an impregnation step (1) can comprise a diffusion step comprising a first substep of immersing the material in a mixture of 50% monomeric solution and 50% solvent, for example ethanol, then a second sub step of immersing the structure resulting from the first sub step in a mixture of 75% monomeric solution and 25% solvent, for example ethanol, then a third substep of immersing the structure resulting from the second substep in a mixture of 100% monomeric solution, and then a fourth substep of immersing the structure resulting from the third substep in a mixture of 100% monomeric solution and of catalyst (for example approximately 1% by mass with respect to the monomeric solution of catalyst as mentioned above has been dissolved in the monomeric solution), each immersion substep being implemented at ambient temperature from a few minutes to 24 hours, for example for 24 hours.

The at least one filling element can be selected from natural resins, synthetic resins and mixtures thereof.

Examples of natural resins comprise, but are not limited to, natural waxes and derivatives thereof, natural fats and derivatives thereof, vegetable oils and derivatives thereof, proteins and derivatives thereof, polypeptides and derivatives thereof, cellulose and derivatives thereof, chitin and derivatives thereof, starch and derivatives thereof, and mixtures thereof. Preferably, the natural resins are natural waxes and derivatives thereof, vegetable oils and derivatives thereof, and mixtures thereof.

Preferably, the at least one filling element is selected from natural waxes and derivatives thereof, natural fats and derivatives thereof, vegetable oils and derivatives thereof, polymers and/or natural resins, synthetic waxes and derivatives thereof, synthetic fats and derivatives thereof, mineral oils and derivatives thereof, synthetic oils and derivatives thereof, polymers and/or synthetic resins, and mixtures thereof.

Preferably, the polymers and/or natural resins are selected from the group consisting of proteins and derivatives thereof, polypeptides and derivatives thereof, polysaccharides and derivatives thereof such as cellulose and derivatives thereof, chitin and derivatives thereof and starch and derivatives thereof, plant resins and derivatives thereof, and mixtures thereof.

Preferably, the polymers and/or synthetic resins are selected from the group consisting of thermoplastic polymers and copolymers thereof, thermosetting polymers and copolymers thereof, vitrimers, and mixtures thereof.

Examples of natural waxes and derivatives thereof comprise, but are not limited to, spermaceti, beeswax, carnauba wax, candelilla wax, lanolin, shellac, and mixtures thereof.

Examples of natural fats and derivatives thereof comprise, but are not limited to, saturated fatty acid triglycerides and mixtures thereof.

Examples of vegetable oils and derivatives thereof comprise, but are not limited to, vegetable oils, epoxidised vegetable oils, hydroformylated vegetable oils, and mixtures thereof.

Examples of proteins and derivatives thereof comprise, but are not limited to, compounds resulting from the combination of more than 100 amino acids, derivatives thereof, and mixtures thereof.

Examples of polypeptides and derivatives thereof comprise, but are not limited to, compounds resulting from the combination of at least four and less than 100 amino acids, and mixtures thereof.

Examples of cellulose derivatives comprise, but are not limited to, cellulose ethers such as methylcellulose, cellulose esters such as cellulose acetate, cellulose hydrolysis products, and mixtures thereof.

Examples of chitin derivatives comprise, but are not limited to, chitin esters, chitin ethers, chitin hydrolysis products, chitosan, chitosan esters, chitosan ethers, chitosan hydrolysis products, and mixtures thereof.

Examples of starch derivatives comprise, but are not limited to, starch esters such as starch acetate, starch ethers, starch hydrolysis products and derivatives thereof, starch oxidation products and derivatives thereof, amylose, amylose esters, amylose ethers, amylose hydrolysis products and derivatives thereof, amylose oxidation products and derivatives thereof, amylopectin, amylopectin esters, amylopectin ethers, amylopectin hydrolysis products and derivatives thereof, amylopectin oxidation products and derivatives thereof, and mixtures thereof.

"Plant resin" preferably means plant secretion products.

Examples of synthetic resins comprise, but are not limited to, synthetic waxes and derivatives thereof, synthetic fats and derivatives thereof, mineral oils and derivatives thereof, synthetic oils and derivatives thereof, thermoplastic polymers and copolymers thereof, thermosetting polymers and copolymers thereof, vitrimers, and mixtures thereof. Preferably, the synthetic resins are thermoplastic polymers and copolymers thereof.

"Synthetic waxes and derivatives of" means materials resulting from chemical synthesis and/or refining of petroleum having similar properties to natural waxes, able in particular to have a melting point above 45° C. Examples of synthetic waxes and derivatives thereof comprise, but are not limited to, any compound resulting from reaction between a fatty acid and a carbon long-chain alcohol, polyethylene waxes, silicone waxes, paraffins, and mixtures thereof.

"Synthetic fats and derivatives thereof" means viscous materials resulting from chemistry and/or refining of petroleum having lubrication properties. Examples of synthetic fats and derivatives thereof comprise, but are not limited to, silicone fats, copper fats, lithium fats, aluminium fats, teflonised fats, vaseline, and mixtures thereof.

"Mineral"" means mixtures based on $C_{15}$-$C_{40}$ alkanes coming from petroleum.

"Synthetic oils" means oils that can be obtained by cracking mineral oils.

Examples of thermoplastic polymers and copolymers thereof comprise, but are not limited to, polyolefins coming from vinyl monomers such as polypropylene (PP), polyethylene (PE), polybutene, polystyrene (PS), polyvinyl chloride and polyvinylidene chloride, polyolefins coming from acrylic monomers such as polyacrylate, polyolefins coming from methacrylic monomers such as polymethyl methacrylate (PMMA) and polybutyl methacrylate, polyacetals such as polyoxymethylene, polyimides, polyetherimides such as Ultem®, thermoplastic elastomers such as Hytrel®, silicones, polysiloxanes such as polydimethylsiloxane (PDMS), polyesters such as polyethylene terephthalate (PET) and polylactic acid (PLA), polyamides such as Nylon, polyurethanes, fluoropolymers such as polytetrafluoroethylene and in particular Teflon®, polycarbonates such as Makrolon®, aliphatic polyethers, aromatic polyethers such as polyphenylene ether and polyphenylene oxide (PPO), phenylene polysulphides such as Ryton®, polyketones, polyaryletherketones such as polyether ether ketone (PEEK), polysulfones, polyethersulfones, polyarylethersulfones (PES), non-crosslinking hot-melt glues, oxetane-based polymers, and mixtures thereof. Preferably, the thermoplastic polymers and copolymers thereof are polyolefins coming from vinyl monomers such as polypropylene (PP), polyethylene (PE), polybutene, polystyrene (PS), polyvinyl chloride and polyvinylidene chloride, polyolefins coming from acrylic monomers such as polyacrylate, polyolefins coming from methacrylic monomers such as polymethyl methacrylate (PMMA) and polybutyl methacrylate, and mixtures thereof.

"Non-crosslinking hot-melt glues" means thermoplastic polymers having a controlled degree of polymerisation so as to be able to melt quickly over a specific temperature range. Examples of non-crosslinking hot-melt glues comprise, but are not limited to, ethylene vinyl acetate (EVA), polyethylenes (PEs), polypropylenes (PPs), polyamides, and mixtures thereof.

Examples of oxetan-based polymers comprise, but are not limited to, oxetane polymers and copolymers, substituted oxetane polymers and copolymers, and mixtures thereof.

"Ultem®" means a resin family based on amorphous thermoplastic polyetherimide (PEI) sold by the company SABIC.

"Hytrel®" means a thermoplastic elastomer sold by the company DuPont.

"Nylon" means poly(hexamethylene adipamide), 6/6 fibre.

"Teflon®" means polytetrafluoroethylene sold by the company DuPont.

"Makrolon®" means a polycarbonate sold by the company Rohm Schweiz AG.

"Rython®" means phenylene polysulfide sold by the company Solvay.

Examples of thermosetting polymers and copolymers thereof comprise, but are not limited to, epoxies, hydrogels, polymers based on diallyl phthalates, polymers based on melamine and/or urea and/or formaldehyde, polymers based on phenol and/or formaldehyde, and mixtures thereof.

Examples of epoxy comprise, but are not limited to, compounds formed by reacting polyepoxide compounds with a hardener. Examples of polyepoxide compounds comprise, but are not limited to, bisphenol derivatives and in particular diglycidyl ether bisphenol A (DGEBA), or any epoxide bisphenol, cycloaliphatic polyepoxides, aromatic polyepoxides, aliphatic polyepoxides, and mixtures thereof. Examples of hardeners comprise, but are not limited to, polythiols, cycloaliphatic polyamines, aliphatic polyamines, aromatic polyamines, anhydrides, phenols, and mixtures thereof.

Examples of hydrogels comprise, but are not limited to, hydrogels formed with polyhydroxyethylmethacrylate and/or triethylene glycol dimethacrylate.

Examples of polymers based on diallyl phthalates comprise, but are not limited to, diallyl polyphthalate.

Examples of polymers based on melamine and/or urea and/or formaldehyde comprise, but are not limited to, polymers based on melamine and/or formaldehyde, polymers based on urea and/or formaldehyde such as aminoplasts, and mixtures thereof.

Examples of polymers based on phenol and/or formaldehyde comprise, but are not limited to, phenoplasts.

The filling compound may also be a vitrimer, generally obtained from thermosetting polymers (such as epoxy) and/or thermoplastic polymers (such as polymethyl methacrylate, polystyrene or high-density polyethylene).

"Vitrimer" means, according to the invention, a novel category of organic material that can be termed polymer. Thus a vitrimer is a light strong polymer which, once hardened, can be remelted and remoulded like glass while having mechanical properties superior to those of glass. It therefore combines the qualities of thermoplastic compounds (which can be remelted and remoulded and therefore recycled) and those of thermosetting compounds which have good mechanical, chemical and thermal properties, but which cannot be reused.

Vitrimers can be synthesised for example by metathesis reactions between dioxaborolanes (compounds containing a boron atom bonded to 2 oxygen atoms) and polymers (such as polymethyl methacrylate) or polystyrene) containing solely carbon-carbon chemical bonds in their skeleton without the addition of catalysts at moderate temperatures of the order of 60° C.

This reaction is generally rapid and effective, the compounds obtained having chemical, mechanical and thermal properties superior to the initial polymers. It does not require a catalyst, which constitutes a real economic and ecological advantage.

"Metathesis" means changes in bonds between atoms leading, on a formal level, to chemical compounds in which the bonds of the various types are almost in the same number and of the same nature as in the starting compounds.

Preferably, the at least one filling element is selected from the group consisting of vegetable oils and derivatives thereof, thermoplastic polymers and copolymers thereof such as the polyolefins coming from vinyl monomers such as polypropylene (PP), polyethylene (PE), polybutene, polystyrene (PS), polyvinyl chloride and polyvinylidene chloride, polyolefins coming from acrylic monomers such as polyacrylate, polyolefins coming from methacrylic monomers such as polymethyl methacrylate (PMMA) and polybutyl methacrylate, and mixtures thereof.

The filling compound may be present in the form of a monomeric solution or a monomeric formulation.

The monomeric solutions and formulations may be commercial products known to the person skilled in the art.

"Monomeric solution" means a mixture of one or more polymerisable monomers, with or without agent activating the polymerisation of these monomers.

As mentioned previously, the impregnation step can be performed in the presence of at least one fluid in supercritical or subcritical phase in which a monomeric solution or monomeric formulation comprising the filling compound is solubilised, optionally in the presence of a cosolvent and optionally in a high-pressure cell. The fluid in supercritical or subcritical phase, optionally in the presence of a cosolvent, may be any fluid as mentioned in WO2018224598 (A1).

One or more polymerisable monomers generally lead to obtaining a thermoplastic (polymer) or a thermosetting (polymer).

Thus the filling compound may be present in the form of a monomeric solution or a monomeric formulation comprising one or more polymerisable monomers leading to the formation of thermoplastic or thermosetting polymers, with or without agent activating the polymerisation of these monomers.

Examples of monomers comprise, but are not limited to, the monomers coming from petroleum (referred to as petro-sourced) including methacrylates, such as ethyl methacrylate, methyl methacrylate, propyl methacrylate, butyl methacrylate, hexyl methacrylate, octyl methacrylate, lauryl methacrylate, 2-ethylhexyl methacrylate, cyclohexyl methacrylate, glycidyl methacrylate, tri-n-butyl tin methacrylate, and 2-hydroxyethyl acrylate; acrylates such as methyl acrylate, ethyl acrylate, butyl acrylate, decyl acrylate, 2-ethylhexyl acrylate and 2-hydroxypropyl acrylate; phthalates such as the dialkylphthalates where the alkyl comprises for example from 1 to 6 carbon atoms; nitriles such as acrylonitrile; styrene and styrene derivatives such as α-methylstyrene, chorostyrene, styrene and tert-butyl styrene; vinyl compounds such as vinyl toluene, vinyl acetate, vinyl chloride, allyl glycidyl ether and vinyl propionate; unsaturated compounds containing a carboxyl group such as acrylic acid, fumaric acid, maleic acid, methacrylic acid; ethylenic compounds such as ethylene glycol or ethylene oxide; butadiene; isoprene; unsaturated monomers containing a nitrogen atom, such as acrylamide, acrylonitrile, N-butoxydimethylacrylamide, vinylpyridine, N-vinylcarbazole, and N-vinylpyrrolidone; and mixtures thereof. These monomers generally lead to forming thermoplastic polymers.

Other examples of monomers comprise, but are not limited to, monomers leading to the formation of thermosetting polymers such as petro-sourced compounds including thermosetting resin precursors such as precursors of epoxy resins, such as the epoxide prepolymers derived from bisphenol such as diglycidyl ether bisphenol A (DGEBA), or any epoxide bisphenol, precursors of oxetane resins, precursors of phenolic resins, precursors of urea resins, precursors of acrylic resins, and mixtures thereof. In this case, at least one hardener is generally present in the filling compound. The hardener can be any thermosetting resin hardener known to the person skilled in the art such as an aliphatic amine, such as isophoronediamine, or cyclic, a carboxylic acid, and anhydride or an ionic liquid.

Mention can also be made of the biosourced monomers leading to the formation of thermoplastic or thermosetting polymers, identical to the monomers coming from petroleum or different, including tannins, such as flavan-3-ol (afzelechin, gallocatechin, catechin) and terpenes; resveratrol; resorcinol; glycerol and derivatives of glycerol such as epichlorohydrin, isomers of propanediol and glycolic acid; derivatives of sugars (isosorbide, sorbitol polyglycidyl ether, trehalose, D-glyceraldehyde, D-threose, D-erythrose, D-arabinose, D-ribose, D-mannose, D-glucose); derivatives of furfural (generally coming from the acidic depolymerisation of hemicellulose); derivatives of maleic or fumaric acid; derivatives of lactic and formic acids; the monomers coming from vegetable oil and fats (cashew nuts, safflower, colza, flax, olive, soya, ricin oil) such as sebacic acid (ricin), cardanol (cashew nuts), linoleic acid (coming from flax), vernonia acid (coming from veronia seeds); hydroxyalcanoic acids, such as those derived from formic, lactic and sebacic acids; bio-ethylene (or biological ethylene); bio-ethylene glycol (or biological ethylene glycol); bio-propylene (or biological propylene); bio-1,4-butanediol (or biological 1,4-butanediol); derivatives of lignin, such as terephthalic acid, gallic acid, vanillin; derivatives of vanillin such as vanillylamine, diglycidylether methoxyhydroquinone, vanillylamine triglycidylether; and mixtures thereof, such as monomers resulting from a combination of derivatives of sugar and fats.

"Biosourced" is intended to mean a molecule wherein all or some, for example from 10 to 90%, preferably from 10 to 30%, of the constituent atoms come from a resource coming from biomass, and not resulting from the anthropic transformation of a fossil resource.

Finally, mention can be made of the hybrid biosourced monomers leading to the formation of thermoplastic or thermosetting polymers, identical to biosourced monomers. "Hybrid biosourced" means a biosourced compound a part of the structure of which has reacted with a molecule the atoms of which do not come from resources coming from biomass.

The advantage of using biosourced monomers is that it is possible either to recover them subsequently during the recycling of the composite material at the end of life or to facilitate the destruction of the composite material at the end of life. This therefore makes it possible to obtain a partially or completely recyclable composite material, which confers on the method according to the invention the character of a sustainable-development or even ecological method (or "green" method).

"Monomeric formulation" means a monomeric solution containing at least one supplementary compound. Such a supplementary compound is generally selected from oligomers, polymers, copolymers with regard to thermoplastics, or prepolymers and pre-copolymers accompanied by at least one hardener for thermosetting compounds. This supplementary compound may also be at least one agent allowing polymerisation such as an initiator (for example a biosourced initiator such as epichlorohydrin, carboxylic acids, amines, and mixtures thereof), a catalyst, preferably thermally activatable or degradable by radiation, a filler, a surfactant, a polymerisation retarder or inhibitor, or a chain-transfer agent, or a mixture of these compounds.

The filler may be organic or mineral. The mineral filler can be selected from the group formed by aluminas, clays, carbon powders, glass beads, diamonds, gypsum, limestone, mica, perlite, quartz, sand, talc, silica, titanium, and mixtures thereof, preferably selected from the group formed by clays, diamonds, glass beads, gypsum, limestone, mica, perlite, quartz, sand, talc, and mixtures thereof. The mineral filler may be functionalised to increase its dispersion and stability in the monomeric filling formulation. At least one surfactant may be added for this purpose also.

The catalyst is selected so as to catalyse, preferably, a radical polymerisation reaction. This choice depends generally, as is known to the person skilled in the art, apart from the monomer, on the polymerisation mode and control thereof.

The catalyst is preferably selected from the group formed by the compounds of the azo type of formula R—N═N—R' where R and R' are alkyl groups optionally comprising at least one supplementary function, such as azoisobutyronitrile and azobisisobutyronitrile (AIBN), peroxides such as benzoyl peroxide, alkyl compounds (generally comprising from 1 to 6 carbon atoms per molecule) that are halogenated (i.e. comprising a halogen atom that is chlorine, bromine, iodine or fluorine), nitroxides, or thiocarbonylthio compounds. However, any other catalyst known to a person skilled in the art can also be envisaged, such as ketone peroxides, hydrogen peroxide, peroxycetal, hydroperoxide, dialkyl peroxide, diacyl peroxides, peroxyesters, peroxy dicarbonates, such as benzoyl peroxide, methyl ethyl ketone peroxide, cumene hydroperoxide, potassium persulfate, tert-butyl peroxyneodecanoate, tert-butyl peroxypivalate, tert-butyl peroxy-2-ethylhexanoate, tert-butyl peroxyisobu-tyrate, 1,1-bis-tert-butylperoxy-3,3,5-trimethylcyclohexane, tert-butyl peroxylaurate, tert-butyl peroxyisophthalate, tert-butyl peroxyacetate, tert-butyl peroxybenzoate, dicumyl peroxide and di-tert-butyl peroxide, compounds of the aromatic ketone type such as the Irgacure® compounds sold by BASF, and mixtures thereof.

When compounds of the aromatic ketone type are used, the activation is preferably implemented under UV irradiation by techniques well known to a person skilled in the art.

It is also possible to initiate the radical reaction by a source of gamma radiation is such as Cobalt 60.

The monomeric solution or the monomeric formulation may furthermore comprise at least one plasticising agent, which may be any solvent, any oligomer, any filler, aimed at reducing the viscosity of the filling compound and thus advantageously to allow better penetration of the filling compound within the lignocellulosic structure of the material.

If the plasticising agent is a solvent, it is generally selected so that it evaporates to a major extent at ambient temperature so as to limit the emission of volatile organic compounds during the life of the composite-material structure. Indeed, the use of monomeric solution or of monomeric formulation containing a low-volatility solvent is not preferred in the context of the present invention since the impregnation of a solvent in the structure of the lignocellulosic materials may lead to the creation of non-grafted molecules trapped in the composite-material structure that could be gradually released. If the plasticising agent is an oligomer, it is selected so that it is durably anchored within the structure in order to avoid any subsequent release.

At least one agent for preserving the structure of the final composite material, such as a UV-ray absorber, may also be added to the monomeric filling formulation. This makes it possible to improve the holding thereof in the structure. It is possible to select such an agent among chromophore compounds such as anthraquinone, compounds based on a benzophenone or benzotriazole unit, diphenyl acrylate, and all or some of the compounds that can be extracted from the lignocellulosic material, and mixtures thereof.

At least one fire-resisting, fungicidal, bactericidal or insecticidal compound may also be added to reinforce the properties of the final composite-material structure. Examples of fire-resisting compounds comprise, but are not limited to, aluminium trihydrate, antimony trioxide, antimony pentoxide and the organophosphorus compounds, and all or some of the compounds that can be extracted from the lignocellulosic material, and mixtures thereof.

The monomeric formulation may furthermore comprise at least one polarity agent selected from the group formed by ethanol, ethylene glycol, methyl ether, N-methyl pyrrolidone, dioxanes, dimethylformamide, diethylene glycol, diethylene glycol dimethyl ether, pyridine, n-butylamine, piperidine, morpholine, 4-picoline, 2-picoline, diethylamine, aniline, acetone, methanol, and mixtures thereof.

The presence of such a polarity agent advantageously affords better penetration of the filling compound within the lignocellulosic structure as well as swelling of the lignocellulosic matrix. This is because the presence of these polarity agents disturbs the hydrogen bridges of the cellulose and thus swells/dilates the microfibrils of the cellulose, which gives rise to better diffusion of the filling compound.

Preferably, the filling compound is selected from thermoplastic polymers and copolymers thereof, as defined previously, or a monomeric solution or a monomeric formulation comprising a mixture of one or more polymerisable monomers leading to the formation of a thermoplastic polymer as defined previously, with or without agent activating the polymerisation of these monomers as defined previously.

Preferably, the filling compound is not a resin based on urethane or a resin based on rubber.

Preferably, the filling compound is not a urea resin or a urea-melamine resin.

Preferably, the filling compound is not lignin.

Preferably, the filling compound is not a flame-retarding compound.

The impregnation step (1) can optionally be followed by a step of fixing the filling compound.

The fixing step can be implemented in various ways, in particular according to the impregnation step (1). It can be implemented in one or more steps. It can be implemented according to a stationary mode or by stages.

Preferably, the step of fixing the filling compound is implemented by polymerisation and/or crosslinking when the filling compound includes at least one polymerisable and/or crosslinkable compound. This polymerisation and/or crosslinking can be implemented in particular so that fibers of the lignocellulosic material are bonded to the transformed filling compound after completion of the fixing step by chemical, physical or physicochemical anchoring. A person skilled in the art is capable of determining the formulation of his filling solution to obtain the required anchoring during the fixing step.

The term "anchoring" relates to a creation of molecular bonds. The structuring of polymer chains in the architecture of the lignocellulosic material takes place either by covalent bonds, in which case a chemically crosslinked lattice is obtained, or by weak bonds or interactions, of the hydrogen or van der Waals bond type, in which case a physical lattice is obtained, or by a mixing of the two types of bond.

The term "chemical anchoring" relates to a molecular bond between two compounds, while the term "physico-chemical anchoring" relates to a bond of the hydrogen, van der Waals, ionic or metallic type between two compounds.

The anchoring of the filling compound can be implemented in various ways, in particular according to the impregnation step.

Thus, when the filling compound is a polymer or a copolymer, preferably thermoplastic, or a vitrimer, the fixing step can consist in fixing, as far as possible, the polymer or copolymer or vitrimer within the structure for subsequent use thereof. In other words, the fixing step can consist in putting said polymer or copolymer or said vitrimer in a physical state such that it can practically not leave the structure under the temperature and pressure conditions in question. These temperature and pressure conditions depend essentially on the subsequent use that may be made of the composite-material structure, namely typically if it is intended to be placed externally (in which case the climate of the place of use must be taken into consideration) or internally. In general, this may result in putting under a temperature below the glass transition temperature of the polymer or copolymer.

When the filling compound is a polymerisable monomer present in a monomeric solution, the fixing step and can consist in polymerising the monomer in the presence of the catalyst. This can generally be done by any polymerisation technique that can be envisaged, such as the thermal method, the UV method, or the plasma method. The choice of the technique depends essentially on the nature of the polymerisation catalyst, as is known to the person skilled in the art.

For example, if the monomeric solution comprises butyl methacrylate and styrene, for example in a proportion of 1 part of butyl methacrylate for 3 parts of styrene, and the catalyst present at the fixing step is azoisobutyronitrile or azobisisobutyronitrile (AIBN), for example to the extent of 0.05 parts, then the fixing step can be implemented by heating at a temperature of 15° C. to 80° C., example of 40° C. or 80° C., under vacuum or under atmosphere devoid of oxygen, for example under an atmosphere devoid of oxygen in the presence of an inert gas such as nitrogen, for 20 to 50 hours, for example for approximately 24 hours.

When the polymer or copolymer obtained is thermosettable, the impregnation step (1) can be implemented in the liquid state and at a temperature higher than the temperature range at which crosslinking is established and said polymer or copolymer begins to harden. Then the fixing step can consist of a polymerisation and then crosslinking of the source monomers of the thermosettable polymer, at a temperature below said range of glass transition temperatures of the polymer or copolymer.

Thus it is possible to implement the impregnation of the lignocellulosic material and to initiate the induced precipitation of the filling compound therein almost simultaneously.

The method according to the invention may further comprise a step of pressing the structure resulting from the fixing step. The pressing step can typically be implemented at a temperature of 80 to 250° C. for 5 to 30 minutes at a pressure of 0.1 to 2.0 MPa. The pressing step may also be implemented under the same conditions mentioned previously, i.e. at a temperature of 15° C. to 80° C., example of 40° C. or 80° C., under vacuum or under atmosphere devoid of oxygen, for example under an atmosphere devoid of oxygen in the presence of an inert gas such as nitrogen, for 20 to 50 hours, for example for approximately 24 hours.

This pressing step may be followed by a step of surface treatment of the structure resulting from the pressing step. The surface-treatment step may typically be implemented chemically, for example by means of ethyl acetate, or thermally and accompanied by putting in a press, in which case the pressing and surface-treatment steps are implemented simultaneously. This advantageously makes it possible to flatten any surface irregularities of the structure.

The surface-treatment step may also be implemented without prior implementation of a pressurising step. In this case it can be implemented on the basis of vapour treatment with acetone or methylene chloride vapour.

The grinding step (2) can be implemented with any type of equipment making it possible to obtain chips.

Preferably, after the grinding step (2), a compound ready to be used and more preferentially ready to be moulded is obtained. In this preferred embodiment, the method does not comprise a supplementary step of impregnation by a filling compound such as a resin after the grinding step (2).

"Use step" means a transformation step.

Preferably, the use step is a shaping step.

The use step, which is preferably a shaping step, can be selected from the group consisting of extrusion such as extrusion blow moulding and blow extrusion, compression such as thermocompression, injection, blowing, swelling, moulding such as vacuum moulding, injection moulding, centrifugation moulding, rotational moulding, thermomoulding, compression moulding, moulding of a mixture in a sheet (Sheet Moulding Compound (SMC)), moulding of a mixture in bulk (Bulk Moulding Compound (BMC)), moulding of a mixture to be moulded in a dough (Dough Moulding Compound (DMC)), moulding of a thick moulding mixture (Thick Moulding Compound (TMC)), resin transfer moulding (RTM, RTM Light), and a combination thereof. Preferably, the use step is an extrusion and/or thermocompression step.

The use step may comprise a heating step optionally followed by a cooling step.

Depending on the filling compound used, a person skilled in the art can select the adapted heating temperature. For example, when the filling compound is a thermoplastic polymer or one of the copolymers thereof, the heating temperature is preferably higher than the glass transition temperature (Tg) of the polymer or of the copolymer used, more preferentially 30° C. above the Tg of the polymer or of the copolymer used. Likewise, when the filling compound is selected from oils, waxes and/or fats, the heating temperature is preferably higher than the melting point of these compounds. When the filling compound is a thermosetting polymer or one of the copolymers thereof, the heating temperature is preferably higher than the Tg of the polymer or of the copolymer used, more preferentially 30° C. above the Tg of the polymer or of the copolymer used. If the pressure used is sufficient, the heating temperature may be below the Tg of the polymer or of the copolymer used.

Preferably, when the filling compound is a thermosetting polymer, the polymerisation reaction (and therefore the fixing reaction of the polymer) may not have terminated at the end of the impregnation step (1) for the compound to be able to be ground correctly during step (2) and then the polymerisation reaction (and therefore the fixing of the polymer) is resumed and finished during step (3). In this case, the pressure exerted during step (3) may be sufficient to allow chemical anchoring of the polymer between the chips.

In this case, a person skilled in the art can select the heating and/or pressure duration necessary for terminating the fixing reaction of the thermosetting polymer during step (3).

When the filling compound is a thermoplastic polymer or one of the copolymers thereof, the heating step may be followed by a cooling step. For example, when the filling compound is a thermoplastic polymer or one of the copolymers thereof, it may be necessary to cool the material obtained since the shaping temperature is higher than the glass transition temperature of the polymer or of the copolymer used. Preferably, when the filling compound is a thermoplastic polymer or one of the copolymers thereof, the material obtained is cooled below the Tg of the polymer or of the copolymer used, more preferentially 30° C. below the Tg of the polymer or of the copolymer used. Likewise, when the filling compound is selected from oils, waxes and/or fats or is a thermosetting polymer or one of the copolymers thereof, the heating step may be followed by a cooling step. Preferably, when the filling compound is selected from oils, waxes and/or fats, the material obtained is cooled below the melting point of these compounds, more preferably to ambient and/or use temperature. Preferably, when the filling compound is a thermosetting polymer or one of the copolymers thereof, the material obtained is cooled below the Tg of the polymer or of the copolymer used, more preferentially 30° C. below the Tg of the polymer or of the copolymer used.

The use step (3) may also comprise the use of ultrasound and molecular excitation.

For example, the use step (3) may comprise the shaping of the chips obtained at the end of step (2) according to one of the techniques as defined previously, for example by thermocompression, comprising a heating step with a temperature ramp of between 1° C. per minute and 50° C. per minute, preferentially between 1° C. per minute and 20° C. per minute, and even more preferentially between 1° C. per minute and 10° C. per minute to a temperature of between 30 and 200° C., preferentially between 70 and 180° C., and even more preferentially between 120 and 170° C., and maintenance at this temperature for a period of between 1 minute and 180 minutes, preferentially between 2 minutes and 90 minutes, and more preferentially between 5 and 45 minutes, and a cooling step while maintaining the pressure and following a temperature ramp of between 0.1° C. per minute and 20° C. per minute, preferentially between 0.1° C. per minute and 10° C. per minute, and even more preferentially between 0.1° C. per minute and 1° C. per minute to a temperature between 5° C. and 90° C., preferentially between 15° C. and 70° C., more preferentially between 25 and 60° C., and maintenance at this temperature for a period of between 1 minute and 24 hr, preferentially between 1 minute and 1 hour, more preferentially between 1 minute and 15 minutes. A person skilled in the art can select the target heating and cooling temperatures as well as the durations according to the filling compound. In particular, the use step (3) may comprise the shaping of the chips obtained at the end of step (2), for example by thermocompression, comprising a heating step with a temperature ramp of 1° C. per minute up to 130° C., and maintenance at this temperature for 20 minutes, and a cooling step while maintaining the pressure and following a temperature ramp of 1° C. per minute down to 40° C. and maintenance at this temperature for 5 minutes. Likewise, the use step (3) may comprise the shaping of the chips obtained at the end of step (2), for example by thermocompression, comprising a heating step with a temperature ramp of 10° C. per minute up to 130° C. and maintenance at this temperature for one hour, and a cooling step while maintaining the pressure and following a temperature ramp of 10° C. per minute down to 20° C. and maintenance at this temperature for one hour.

The shaping step can be implemented in an adapted mould. Thus the use step may also comprise a step of removing the composite material obtained from the mould.

The method as defined previously may also comprise at least one step selected from a step of partial or total delignification of the lignocellulosic material, a step of partial or total extraction of the extractables and chromophores from the lignocellulosic material, a step of activating the hydroxyl groups, a step of oxidising the lignocellulosic material, a step of adding fibers, a sol-gel coating step, a step of adding additives, and combinations thereof.

These steps may be implemented before, simultaneously with or after the steps (1) of impregnation, (2) of grinding and/or (3) of use.

The step of partial or total extraction of the extractables and chromophores from the lignocellulosic material may be as defined in WO2017098149 (A1). In particular, the step of partial or total extraction of the extractables and chromophores may comprise:

at least one step of pre-soaking a lignocellulosic-material structure with at least one fluid, generally to dissolve some of the extractables present in the material; followed by at least one step of pre-washing the structure coming from the pre-soaking step, with at least one fluid, so as to evacuate the dissolved compounds resulting from the pre-soaking substep, as defined in WO2017098149 (A1).

A step of treatment by total or partial delignification can make it possible to render the lignocellulosic material hydrophobic and to obtain better grafting between the lignocellulosic material and the polymer. Likewise, a treatment step by total or partial delignification or partial or total extraction of the extractables and chromophores from the lignocellulosic material can make it possible to mitigate any problems of non-homogeneous colour of the chips and also any problems related to odour.

"Partial or total delignification" means a step of partial or total extraction of the lignin from the lignocellulosic material.

The delignification step may be as defined in WO2017098149 (A1). In particular, the delignification step may comprise:

(a1) at least one step of soaking the lignocellulosic-material structure with at least one fluid to partially dissolve the lignin present in the material (as defined in WO2017098149 (A1)) or to totally dissolve the lignin present in the material, and (a2) at least one step of washing the structure coming from step (a1) with at least one organic fluid so as to evacuate the dissolved lignin resulting from the soaking step (a1), so as to produce a partially or totally delignified structure.

Examples of fluids used at step (a1) comprise but are not limited to fluids described in WO2017098149 (A1) such as:

an acid or basic solution, aqueous or not;
an acid or basic oxidising solution, aqueous or not;
a pure ionic liquid;
an ionic liquid in a mixture with a co-solvent;
an ionic liquid containing one or more enzymes;

an ionic liquid in a mixture with a co-solvent containing one or more enzymes;

an ionic liquid in a mixture with a co-solvent and a fluid;

an ionic liquid in a mixture with a co-solvent and a fluid and containing one or more enzymes;

a fluid containing at least one biological organism such as bacteria, microbes or fungi;

a fluid containing at least one enzyme;

a two-phase system, one of the phases of which consists of an ionic liquid, pure or in a mixture with at least one miscible solvent, and the other phase of which consists of a supercritical fluid;

a two-phase system, one of the phases of which consists of an ionic liquid, pure or in a mixture with at least one miscible solvent, on the other phase of which consists of a supercritical fluid, further containing one or more enzymes in solution in the phase containing the ionic liquid; or mixtures thereof.

In particular, examples of fluids used at step (a1) comprise but are not limited to:

an aqueous solution comprising a mixture of sodium chloride and sodium hydroxide, or an aqueous liquid comprising monoethanolamine, or a basic solution comprising KOH;

an aqueous solution comprising a mixture of acetic acid and hydrogen peroxide, or an acid solution comprising HBr, $H_2SO_4$ or $H_3PO_4$;

a fluid comprising at least one enzyme, optionally in the presence of at least one ionic liquid or in the presence of at least one ionic liquid and at least one co-solvent;

a pure ionic liquid;

an ionic liquid containing one or more enzymes in solution;

an ionic liquid in a mixture with at least one solvent miscible with the ionic liquid;

an ionic liquid in a mixture with at least one miscible solvent containing one or more enzymes in solution;

a two-phase system, one of the phases of which consists of an ionic liquid, pure or in a mixture with at least one miscible solvent, and the other phase of which consists of a supercritical fluid;

a two-phase system, one of the phases of which consists of an ionic liquid, pure or in a mixture with at least one miscible solvent, and the other phase of which consists of a supercritical fluid, further containing one or more enzymes in solution in the phase containing the ionic liquid; and any solution of a pure compound or of a mixture of compounds, containing at least one enzyme;

and mixtures thereof.

Examples of organic fluids used at step (a2) comprise but are not limited to organic fluids described in WO2017098149 (A1) such as liquids selected from the group formed by ethanol, hexane, isopropanol, heptane, and mixtures thereof.

The delignification step may also be as defined in WO2018224598 (A1). In particular, the delignification step may comprise at least one step of extracting lignin from a ligno-cellulosic-material structure by at least one fluid in supercritical or subcritical phase, the lignin being partially extracted as defined in WO2018224598 (A1) or totally extracted.

Examples of fluids in supercritical or subcritical phase comprise but are not limited to fluids described in WO2018224598 (A1) such as:

carbon dioxide $CO_2$ in supercritical phase, preferably mixed with at least one polar co-solvent selected from dioxane, water, methanol, ethanol, acetic acid, acetone, and mixtures thereof;

at least one alcohol in supercritical phase, said alcohol being selected from tert-butanol and isopropanol;

water in subcritical phase, preferably mixed with at least one base or at least one acid.

The step of extracting lignin can be implemented in the presence of at least one enzyme selected from the group formed by laccase, lignin peroxidase (LiP), manganese peroxidase (MnP) xylanase, as described in WO2018224598 (A1).

The fluid in supercritical or subcritical phase may furthermore comprise at least one catalyst chosen from 2,2'-azino-di(3-ethylbenzothiazolin-6-sulfonic acid) (or ABTS), 1 hydroxybenzotriazole (HBT), N-hydroxyphthalimide (HPI), N-hydroxy-N-phenylacetamide (NHA), 2,2,6,6-tetramethylpiperidine-1-oxyl (TEMPO), violuric acid, and mixtures thereof, as described in WO2018224598 (A1).

"Extractables" means molecules that intensely absorb visible light. The presence thereof in a porosity involves the existence of a large number of interfaces, which has an effect on the diffusion and propagation of light radiation in the material. The term "extractables" embraces a very large set of molecules resulting from secondary metabolites synthesised during the growth of the lignocellulosic material. They are present in relatively small quantities (between 5 and 10% by weight) in the form of mixtures, sometimes complex, and highly variable, which are related to the nature of the lignocellulosic material. The variability of these molecules (in quantity and in quality) is great. The composition of the soil and the climate of the place of growth of a lignocellulosic material in question greatly influence the chemical identity of this material, including the extractables thereof.

The extractables contain molecules having highly varied structures, functionalities and properties, which may be polar or non-polar, hydrophilic or hydrophobic, linear, mono-aromatic or poly-aromatic. Among the extractables, mention can be made of the following compounds: waxes and fats, terpenes (monoterpenes, diterpenes, triterpenes, sesquiterpenes, diterpenic acids) and phenolic compounds (derivatives of phenols, lignans, stilbenes, flavonoids, biflavonoids, condensed tannins, hydrolysable tannins).

Extractables provide additional chemical protection for the wood. This is because they are often involved in the defence mechanisms of the lignocellulosic material against external attacks, such as fungi, enzymes, xylophagous insects or microbes. They are also at the basis of the odour and partly of the colour, as well as the intrinsic length of life of the lignocellulosic material.

"Chromophores" means a group of atoms including one or more double bonds, and forming with the rest of the molecule a sequence of conjugate double bonds, i.e. an alternation of double and single bonds. The existence of a sufficiently long sequence of conjugate double bonds in an organic molecule, or the association with one or more auxochromes, creates a delocalised electronic cloud that may come into resonance with the incident radiation and thus absorb it. Chromophores are therefore partly responsible for the coloured appearance, just like the extractables that play a role in the colouring. Examples of chromophores comprise, but are not limited to, groups of the α-carbonyl type, coniferaldehydes, and mixtures thereof.

"Activation of the hydroxyl groups" here means any reaction in the presence of an organic co-reagent having a sufficiently electrophilic function to allow the creation of a C—O bond, between a carbon of the co-reagent and an oxygen of the hydroxyl group. Examples of activation of hydroxyl groups comprise, but are not limited to:

a step of acylation by acyl halides, carboxylic acids, acid anhydrides, esters such as methyl esters or ethyl esters, amides, or mixtures thereof; and a step of etherification by alkyl halides, epoxides, alcohols, alkenes, enols, ketones, aldehydes, or mixtures thereof.

"Oxidation step" means any chemical reaction in which the oxidised element loses one or more electrons.

Examples of fibers comprise, but are not limited to, fibers of paper, wood, flax, coconut, rice, hay, straw, bamboo, kenaf, hemp, aramid, jute, husks of cereals and fruits such as oats, wheat, rye and barley, coconut shells, and mixtures thereof.

For example, between 1 and 70% by weight supplementary fibers, preferably between 3 and 50% by weight supplementary fibers and even more preferentially between 5 and 30% by weight supplementary fibers with respect to the total weight of the lignocellulosic material can be added.

Examples of sol-gel coatings comprise, but are not limited to, organically modified silicates or silicas, coatings based on silicon such as those resulting from the condensation of alkoxysilanes or derivatives thereof, and mixtures thereof.

"Additives" means compounds that confer, on the composite material obtained, specific properties such as resistance to high temperatures, fire resistance, resistance to UV, specific rheological properties, and/or specific barrier properties.

A person skilled in the art can select the appropriate quantity of additive. Preferably, from 0.001% to 50% by weight, preferably between 0.1% and 20% by weight and even more preferentially between 1% and 10% by weight additives with respect to the total weight of the filling compound can be added.

Examples of additives comprise but are not limited to fillers, pigments, dyes, UV-protection agents, fire-resistant compounds, fungicides, bactericides or insecticides, and mixtures thereof.

"Filler" means insoluble particles able to improve the mechanical and/or hydrophobic properties of the material. Examples of fillers comprise, but are not limited to, mineral fillers such as silicon dioxide, quartz, mica, kaolin, talc, chalk, carbon black and mixtures thereof.

"Pigment" means insoluble particles, preferably with a small diameter, such as nanometric particles of iron oxide.

Examples of pigments comprise, but are not limited to, mineral pigments such as powders resulting from the grinding of mineral substances, in particular ochre, lapis lazuli, iron oxide and slate, vegetable pigments such as substances coming from plants, in particular indigo, madder and saffron, synthetic pigments such as pigments obtained by chemical synthesis, in particular Egyptian blue, ultramarine blue (Guimet blue), vermilion and phthalocyanines, and mixtures thereof.

"Dye" means soluble molecules.

Examples of dyes comprise, but are not limited to, azo dyes, anthraquinone dyes, indigo dyes, triarylmethane derivatives, chlorine derivatives, acridine derivatives, quinoline derivatives, polymethines, aniline derivatives, and mixtures thereof.

"UV-protection agents" means compounds capable of capturing light radiation with a wavelength of less than 400 nm and/or of capturing the radicals resulting from UV degradation and/or of deactivating excited states of molecules.

Examples of UV-protection agents comprise, but are not limited to, UV-ray absorbers such as chromophore compounds such as anthraquinone; compounds based on a benzophenone unit such as compounds coming from 2-hydroxybenzophenone; compounds based on a benzotriazole or diphenyl acrylate unit; all or some of the compounds that can be extracted during the partial and/or total delignification step; particles, preferably nanometric, of metal oxides such as zinc oxide, titanium dioxide and iron oxides; radical capturers such as the primary antioxidants capable of reacting with peroxide, alkoxy, hydroxyl and alkyl radicals (for example hindered phenolic compounds such as butylated hydroxytoluene (BHT)) or such as the sterically hindered amines derived from tetramethylpiperidine (for example HALS compounds—light stabilisers based on hindered amines); hydroperoxide capturers such as the secondary antioxidants capable of reacting with the hydroperoxides formed by primary antioxidants (for example phosphite esters such as tris(2,4-di-tert-butylphenyl)phosphite); ozone-protecting compounds such as the compounds coming from p-phenylenediamine such as N-isopropyl-N'-phenyl-1,4-phenylenediamine; compounds capable of inhibiting excited states (deactivator or quencher) such as nickel-based complexes (for example nickel phenolates); and mixtures thereof.

Examples of fire-resisting compounds comprise, but are not limited to, aluminium trihydrate, antimony trioxide, antimony pentoxide and organophosphorus compounds, and all or some of the compounds that can be extracted from the lignocellulosic material, and mixtures thereof.

Examples of fungicidal, bactericidal or insecticidal compounds comprise, but are not limited to, copper in salt or complex form (such as copper arsenates), sulphur as such or in the form of sulphur compounds (such as thiocarbamates), sodium borate and products based on sodium borate, benzimidazole derivatives (such as carbendazim), and mixtures thereof.

The method as defined above may also comprise a step of conditioning the chips of impregnated lignocellulosic material obtained at the end of step (2) before use thereof.

The method according to the invention has the following advantages:

no preparation of the masterbatch: the wood chips are preimpregnated and ready to be used ("ready-to-melt") method;

no difficulty in use according to the differential ratio between fiber and filling compound such as a polymer: impregnating a filling compound such as a polymerisable monomer in situ in the cavities of the lignocellulosic material affords a perfect ratio/equilibrium between fiber and filling compound such as a polymer in the lignocellulosic material on a mesoscopic scale. Because of this the viscosity of the product obtained at the end of step (2) is low while having a fairly high fiber density to limit the differential shrinkage of the material and to confer excellent environmental characteristics on the product;

homogeneity, repeatability and consistent technical characteristics of the composite obtained: cellulosic composite materials are generally polymer matrices with an interior fibrous reinforcement (anarchic lattice of fibers encapsulated in polymer granules). The particularity of the invention is being reinforced not from inside but from outside: the wood is impregnated and its cellular structure "frames" the filling compound such as a polymer. Because of this there is no problem with homogeneous dispersion of the fibers or regularity of the material, the preimpregnated chips auto-assemble, for example by thermal compression, and polymerise with each other, creating ease of use and consistent technical characteristics with a low scrappage rate;

aesthetic advantages: possibility of using large chips and reinforcing the appearance of naturalness sought, mixing wood species for multiple variations in appearance. The present invention also offers the possibility of having wood chips treated for example by delignification or removal of extractables so as to overcome the problems of non-homogeneous colour of the chips as well as odour;

mechanical advantages: the longer the fibers, the more the mechanical performance of the composite material is improved. The use of large preimpregnated wood chips makes it possible to preserve the architecture of the wood on a nanoscopic scale compared with the use of discrete fibers;

no multilayer assembly: the method and material make it possible to create solid, aesthetic, high-performance parts (in particular by compression moulding and by moulding a mixture in sheet form (SMC)), without the need to combine structural layers and finishing layers as described in the prior art. The part is thus moulded, extruded or injected in a single piece with the functional elements directly integrated.

The method according to the invention makes it possible to produce parts with a very complex geometry with radii of curvature of less than 0.3 mm.

Compared with the methods of the prior art, the production time for a part is shortened, the scrappage rate reduced, the manufacturing method is simplified by virtue of the elimination of assembly steps, the cycle time is reduced and the cost of the part is reduced;

recycling and environmental performance: the composite obtained is in the form of a monomaterial, which facilitates recycling thereof and separation of the constituents thereof by chemical method (solvolysis, depolymerisation) or mechanical method (grinding). The material can be ground and then reused many times through various implementations, conferring on it excellent environmental performance and a long life cycle;

price performance: the product obtained at the end of step (2) has a high fibre/chip density, thus reducing the cost of the composite (the filling compound such as a polymer being more expensive than the biomass).

"Large wood chips" means chips with a size greater than 5 mm.

The present invention also relates to a lignocellulosic composite material able to be obtained by the method as defined above, characterised in that it is reinforced from outside.

"Composite reinforced from outside" means a composite the fibers and matrix of which are interpenetrated at a molecular level unlike conventional composites the fibers of which are enrobed by the matrix. Thus, in a composite reinforced from outside according to the invention, the cellular structure of the wood is impregnated and its cellular architecture/structure "frames" the filling compound such as a polymer, forming a structured lattice. The major difference with the composites reinforced from inside therefore lies in a geometric reversal of the reinforcement (interior v. exterior) and a level of adhesion between wood and filling compound such as a polymer that is much more precise on a mesoscopic scale for the composite reinforced from outside (encapsulation of the fiber for a composite reinforced from inside versus impregnation of the cell for a composite reinforced from outside).

On the other hand, in a conventional composite reinforced from inside, the fibers can be disposed randomly or in an ordered fashion but do not form a structured lattice (they form an anarchic lattice of fibers encapsulated in polymer granules). In addition, in a conventional composite reinforced from inside the matrix wets the external part of the fibers without filling them.

The lignocellulosic composite material as defined previously has excellent physicochemical and mechanical properties (resistance to wear, resistance to traction, resistance to impact), excellent properties of adhesion between the lignocellulosic material and the filling compound such as a polymer or copolymer, even at various temperatures, excellent barrier properties and properties regarding permeability to water or gas, excellent chemical resistance and good resistance to UV and high temperatures.

The lignocellulosic composite material as defined above has properties that make it possible to make it conform to current regulations, in particular in the cosmetic packaging sector.

The invention also concerns the use of the lignocellulosic composite material as defined previously for manufacturing containers, parts or surfaces, in particular for:

The transport sector, for example for the automobile, aeronautical and nautical sectors, The packaging sector, for example for cosmetic containers, luxury packages, and food packages and containers, The building sector, for example for fitting out, finishing elements, wall panels, finishings, floor coverings and façade elements, The furnishing sector, for example for furniture and design, and The consumer sector, for example for accessories, sports articles and other objects.

Examples of containers, parts or surfaces comprise, but are not limited to, a cover, a stopper with a screw thread, a screw thread, a valve, a fastening system, an opening system and a finishing surface.

EXAMPLES

Example 1: Method for Manufacturing a Lignocellulosic Composite Material Reinforced from Outside Protocol:

Step 1: Chemical Treatment of the Lignocellulosic Material with a View to Partially Delignifying Said Material:

A sheet of maple wood with a dimension of 300×300×0.7 was immersed in ethanol for 24 hr.

Step 2: Impregnation of a Filling Compound in the Material:

A mixture of butyl methacrylate and styrene in a volume ratio of 1 part of butyl methacrylate for 3 parts of styrene was next created, which gave a monomeric solution that was next de-gassed under nitrogen.

The sheet of wood was next immersed in 500 mL of a first impregnation bath composed of 50% by volume monomeric solution and 50% by volume ethanol for 24 hr at ambient temperature under nitrogen.

The sheet of wood was next immersed in 500 mL of a second impregnation bath composed of 75% by volume monomeric solution and 25% by volume ethanol for 24 hr at ambient temperature under nitrogen.

The sheet of wood was next immersed in 500 mL of a third impregnation bath composed of 100% by volume monomeric solution for 24 hr at ambient temperature under nitrogen.

The sheet of wood was next immersed in 500 mL of a fourth impregnation bath composed of 100% by volume monomeric solution in which 1% by mass azobisisobutyronitrile with respect to the monomeric solution was dissolved, for 24 hr at ambient temperature under nitrogen.

Step 3: Fixing of the Filling Compound in the Material:

The sheet of wood was next put in a sealed Teflon® mould with an excess of impregnation bath. The mould was next inerted with nitrogen and then closed and pressed for 24 hr at 80° C.

Step 4: Grinding of the Composite with a View to Obtaining Chips of Preimpregnated Material:

The preimpregnated sheet of wood thus obtained was next ground in a granulator in order to obtain chips with a size of between 10 and 20 mm.

Step 5: Compression and Heating of the Chips in a Defined Structure so as to Achieve Sufficient Temperature for Adhesion of the Elements Together:

The chips thus obtained were shaped by thermocompression by putting them in a mould under pressure, heated with a temperature ramp of 10° C. per minute up to 130° C. and maintained at this temperature for one hour.

Step 6: Cooling of the Assembly and Removal from the Mould:

The mould was next cooled while maintaining the pressure, at a temperature ramp of 10° C. per minute down to 20° C. and maintained at this temperature for one hour.

The shape thus obtained was next extracted from the mould.

The composite material thus obtained is composed of chips of lignocellulosic material reinforced from outside and bonded together.

Comparison between a composite reinforced from outside obtained according to the method of the present invention and a composite reinforced from inside of the prior art:

In a conventional composite reinforced from inside, the fibers can be disposed randomly or in an ordered fashion but do not form a structured lattice. In addition, the matrix wets the external part of the fibers without filling them.

On the other hand, in the composite material reinforced from outside obtained according to the invention, a structured lattice forms and the matrix fills the fibers.

The invention claimed is:

1. A method for manufacturing a lignocellulosic composite material comprising:
  (a) impregnating a lignocellulosic material with at least one filling element to obtain an impregnated lignocellulosic material,
    wherein a fiber of the impregnated lignocellulosic material and the at least one filling element form a structural lattice within the impregnated lignocellulosic material;
  (b) subsequent to step (a), grinding the impregnated lignocellulosic material to obtain a plurality of chips of the impregnated lignocellulosic material,
    wherein the plurality of chips comprises chips having a size of greater than or equal to about 0.5 mm;
  (c) subsequent to step (b), using the plurality of chips of the impregnated lignocellulosic material to obtain the lignocellulosic composite material.

2. The method of claim 1, wherein the at least one filling element is selected from the group consisting of a natural wax and a derivative thereof, a natural fat and a derivative thereof, a vegetable oil and a derivative thereof, a polymer and/or a natural resin, a synthetic wax and a derivative thereof, a synthetic fat and a derivative thereof, a mineral oil and a derivative thereof, a synthetic oil and a derivative thereof, a polymer and/or a synthetic resin, and a mixture thereof.

3. The method of claim 2, wherein the at least one filling element is the polymer and/or the natural resin, wherein the polymer and/or natural resin are selected from the group consisting of a protein and a derivative thereof, a polypeptide and a derivative thereof, a polysaccharide and a derivative thereof, a plant resin and a derivative thereof, and a mixture thereof, wherein the polysaccharide and the derivative thereof comprise a cellulose and a derivative thereof, a chitin and a derivative thereof, or a starch and a derivative thereof.

4. The method of claim 2, wherein the at least one filling element is the polymer and/or the synthetic resin, wherein the polymer and/or the synthetic resin are selected from the group consisting of a thermoplastic polymer and a copolymer thereof, a thermosetting polymer and a copolymer thereof, a vitrimer, and a mixture thereof.

5. The method of claim 4, wherein the polymer and/or the synthetic resin are the thermoplastic polymer and the copolymer thereof, wherein the thermoplastic polymer and the copolymer thereof are selected from the group consisting of polyolefin derived from a vinyl monomer, polyolefin derived from an acrylic monomer, polyolefin derived from a methacrylic monomer, polyacetal, polyimide, polyetherimide, thermoplastic elastomer, silicone, polysiloxane, polyester, polyamide, polyurethane, fluoropolymer, polycarbonate, aliphaticpolyether, aromatic polyether, phenylene polysulfide, polyketone, polyaryletherketone, polysulfone, polyethersulfone, polyarylethersulfone, non-crosslinking hot-melt glue, oxetane based polymer, and a mixture thereof.

6. The method of claim 4, wherein the polymer and/or the synthetic resin are the thermosetting polymer and the copolymer thereof, wherein the thermosetting polymer and the copolymer thereof are selected from the group consisting of epoxy, hydrogel, polymer based on diallyl phthalate, polymer based on melamine and/or urea and/or formaldehyde, polymer based on phenol and/or formaldehyde, and a mixture thereof.

7. The method of claim 1, wherein the at least one filling element is in the form of a monomeric solution or a monomeric formulation comprising one or more polymerizable monomers, optionally in combination with agent activating polymerization, wherein the one or more polymerizable monomers is capable of forming a thermoplastic or a thermosetting polymer.

8. The method of claim 1, wherein the using of (c) comprises shaping the impregnated lignocellulosic material using extrusion, extrusion blow moulding, blow extrusion, compression, thermocompression, injection, blowing, swelling, moulding, vacuum moulding, injection moulding, centrifugation moulding, rotational moulding, thermomoulding, compression moulding, moulding of a mixture in a sheet, moulding of a mixture in bulk, moulding of a mixture to be moulded in a dough, moulding of a thick moulding mixture, resin transfer moulding, or a combination thereof.

9. The method of claim 1, further comprising at least one of: partially or completely delignifying the lignocellulosic material, partially or completely extracting extractables and chromophores from the lignocellulosic material, activating hydroxyl groups of the lignocellulosic material, oxidizing the lignocellulosic material, adding fibers, performing sol-gel coating, adding additives, and combinations thereof.

10. A lignocellulosic composite material manufactured by the method of claim 1, wherein the lignocellulosic composite material is reinforced from outside.

11. The lignocellulosic composite material of claim 10, wherein the lignocellulosic composite material is configured to be used for manufacturing a container, a part, or a surface.

12. The method of claim 1, wherein the impregnating the lignocellulosic material comprises bringing the lignocellulosic material into contact with a fluid containing the at least one filling element.

13. The method of claim 12, wherein the bringing the lignocellulosic material into contact with the fluid comprises soaking the lignocellulosic material in the fluid.

14. The method of claim 1, further comprising contacting the lignocellulosic material with a solvent.

15. The method of claim 1, wherein the impregnating the lignocellulosic material is carried out under an oxygen depleted environment.

16. The method of claim 15, wherein the oxygen depleted environment comprises a nitrogen gas environment.

17. The method of claim 12, wherein the impregnating the lignocellulosic material further comprises bringing the lignocellulosic material into contact with a second fluid containing a second filling element.

18. The method of claim 17, wherein the impregnating the lignocellulosic material further comprises bringing the lignocellulosic material into contact with a third fluid containing a third filling element.

19. The method of claim 18, wherein the impregnating the lignocellulosic material further comprises bringing the lignocellulosic material into contact with a fourth fluid containing a fourth filling element.

20. The method of claim 19, wherein the using of (c) comprises compressing and heating the impregnated lignocellulosic material at a temperature gradient of at least 10° C. per minute to 130° C., and holding the temperature at least at 130° C. for at least 1 hour.

* * * * *